G. W. McCORMICK.
Churn Dashers.

No. 139,406. Patented May 27, 1873.

Scale.

WITNESSES:
Thos Lowe
Wm Henry Lake

INVENTOR:
G. W. McCormick

UNITED STATES PATENT OFFICE.

GEORGE W. McCORMICK, OF ST. FRANCIS COUNTY, ARKANSAS.

IMPROVEMENT IN CHURN-DASHERS.

Specification forming part of Letters Patent No. 139,406, dated May 27, 1873; application filed August 20, 1872.

*To all whom it may concern:*

Be it known that I, G. W. McCORMICK, of the county of St. Francis and State of Arkansas, have invented certain Improvements in Churn-Dashers, of which the following is a specification:

The object of my invention is to lessen the amount of muscular exertion required in raising the reciprocating dasher in the operation of churning by decreasing the resisting surface of the dasher to be raised, and to expedite the consummation of the operation by a more thorough separation of the mass of milk at each stroke of the dasher, and by the introduction at the same time of an increased quantity of air, which is conducive to this end.

Figure 1:
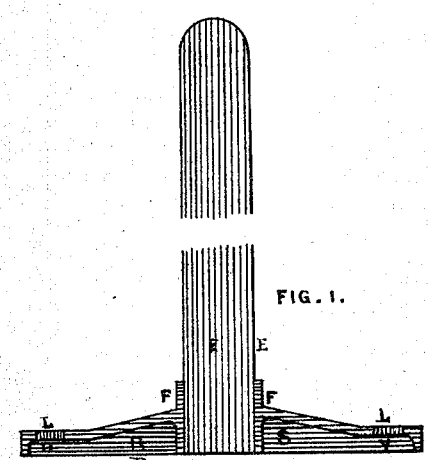
Figure 2:
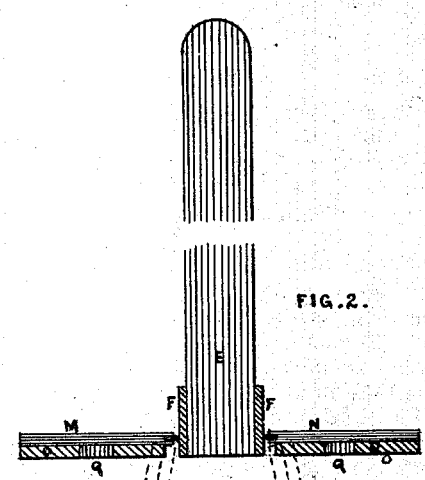
Figure 3:
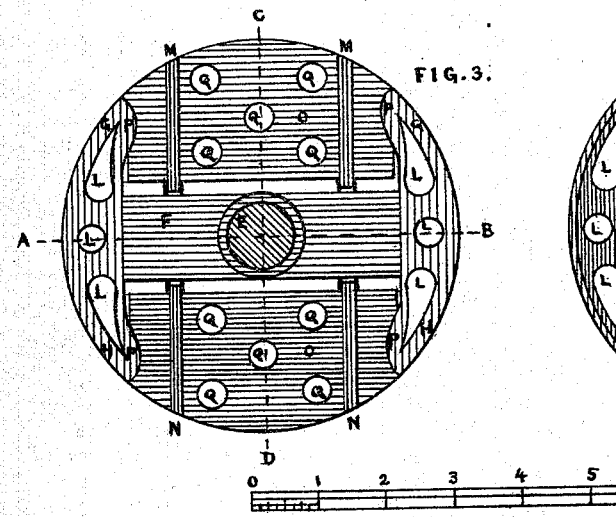
Figure 4:
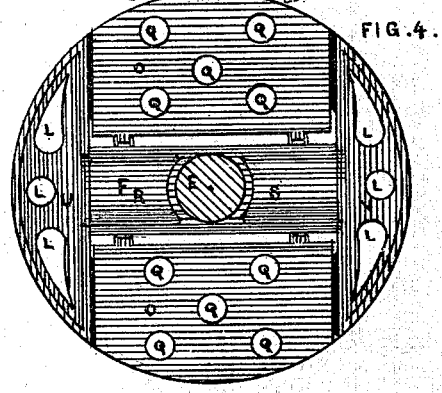

Figure 1 is a vertical section of my dasher, taken on the line A B of Fig. 3. Fig. 2 is a vertical section, taken on the line C D of Fig. 3. Fig. 3 is a top view. Fig. 4 is a view of the bottom.

E is the staff or handle of an ordinary up-and-down churn-dasher, set in a horizontal cross-bar, F, having at each end the T-heads G H and G H, the under side of the cross-bar and of the T-heads being concave, as represented in Figs. 1 and 4, and being also pierced by the holes L and provided with stops P. Hinged to the cross-bar F by the strengthening battens M and N (or pintled in the T-heads if found more expedient) are two flaps, O and O, having a natural downward motion of their hinges, as shown by the dotted lines O' and O' of Fig. 2, and prevented from turning upward above the general horizontal plane of the dasher by the stops P extending from the inner sides of the T-heads and over the outside corners of the flaps. These flaps O and O are likewise pierced with holes Q extending through. The manual operation of my dasher is just as is practiced with any ordinary dasher worked by hand with an up-and-down motion or stroke. Having placed the milk to be churned in an upright churn or proper vessel, its interior conforming to the general horizontal shape of the dasher, and agreeing approximately with it in size, I move up and down as briskly as may be necessary the staff E, and with it the dasher proper, to which it is affixed. As the dasher is raised or lifted up the flaps O and O, by the downward pressure of the fluid through which they are drawn, and aided by their own gravity, drop into the positions indicated by the dotted lines O' and O' of Fig. 2, thus requiring less quantity and less weight of milk to be lifted by the laborious upstroke than would be the case if the whole dasher presented an entire rigid milk-bearing surface, while at the easier down-stroke, in which it is desirable to act on as great a quantity of the milk as is practicable, the flaps are, by the resistance of the milk against which they are pressed, forced out and open, and, so spread, are prevented from closing upward by the stops P. When the dasher is lifted by the upstroke (which, for this reason, I preferably extend or continue up above the milk) the concavities R U and S V, on the under side of the cross-bar, and of the T-heads G H and G H, become receptacles for air, which, partially retained by the quick downward motion of the dasher, is carried into the mass of the milk, whereby, being compressed in bulk, it forces its way toward and through the holes L, carrying with it in columns into the upper air of the body of the churn the milk under its immediate influence. These holes, together with the holes Q of the flaps, are for the further purpose of giving more thorough mechanical separation to the mass of milk than would be effected by a solid dasher.

It is obvious that my dasher may be made, in its horizontal form, either circular or square; that it may be operated by other means than hand power, and that it may be made of metal wholly or in part, instead of mainly of wood.

I do not claim a horizontal cross-bar or dasher, affixed rigidly to a perpendicular staff or handle; nor do I claim a flap or flaps closing or shutting downward at the upstroke of the dasher and spreading out open at the down-stroke, for I am aware that neither of these features is new.

I claim as my invention—

A churn-dasher, consisting of the recessed cross-bar provided with perforated segmental-shaped ends and the hinged and perforated flaps, substantially as specified.

GEO. W. McCORMICK.

Witnesses:
 THOS. C. LOWE,
 WM. HENRY LAKE.